(No Model.)
C. R. SWEET.
ROAD ENGINE.
No. 284,147. Patented Aug. 28, 1883.
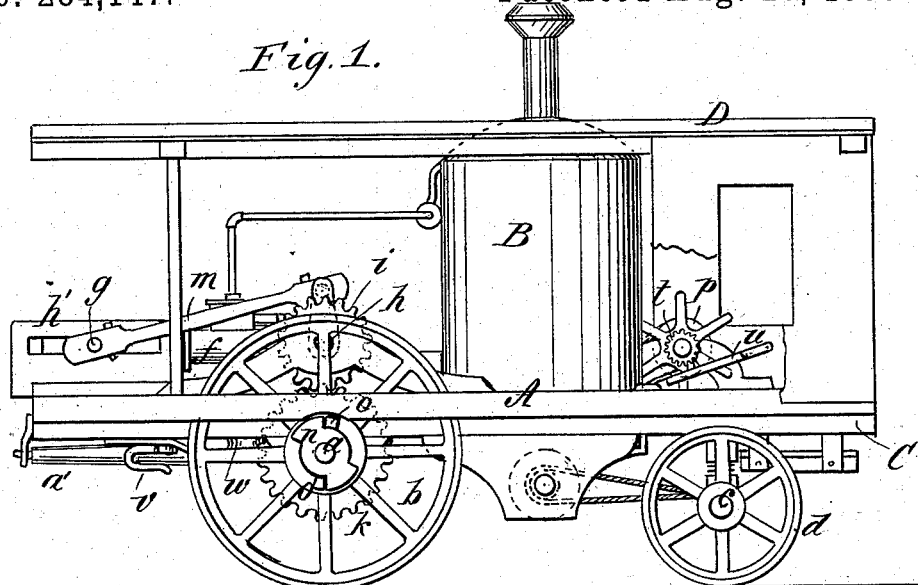
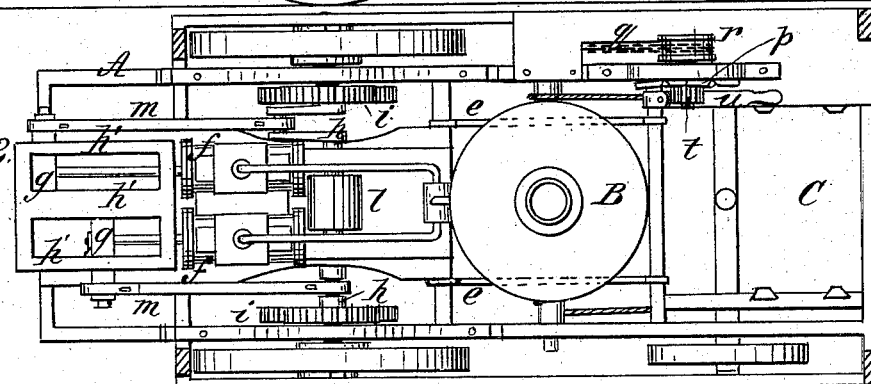
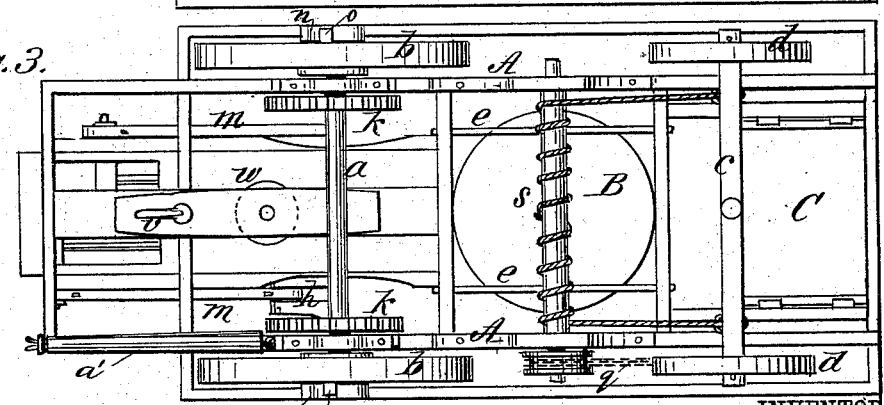
WITNESSES:
Donn Twitchell
C. Sedgwick
INVENTOR:
C. R. Sweet
BY Munn & Co
ATTORNEYS.

UNITED STATES PATENT OFFICE.

CHARLES R. SWEET, OF PORTSMOUTH, OHIO.

ROAD-ENGINE.

SPECIFICATION forming part of Letters Patent No. 284,147, dated August 28, 1883.

Application filed March 8, 1883. (No model.)

*To all whom it may concern:*

Be it known that I, CHARLES R. SWEET, of Portsmouth, in the county of Scioto and State of Ohio, have invented a new and Improved Road-Engine, of which the following is a full, clear, and exact description.

The object of my invention is to construct a road-engine for use in the streets of cities, on farms, and on country roads, and that may also be used as a stationary power for farm work, or otherwise, wherever available.

To that end my invention consists in certain novel features of construction and arrangement of parts, whereby the engine can be conveniently manipulated and the power applied with the greatest possible advantage, as hereinafter described and claimed.

Reference is to be had to the accompanying drawings, forming part of this specification, in which similar letters of reference indicate corresponding parts in all the figures.

Figure 1 is a side elevation of my improved engine. Fig. 2 is a plan view of the same, and Fig. 3 is an inverted plan view of the engine.

The mechanism and other parts are carried by a frame, A, of suitable size and form, which frame is supported upon the rear axle, $a$, and large wheels $b\ b$, loose on the axle, and a forward swiveling axle, $c$, on which are loose wheels $d\ d$.

B is a boiler, which is of the vertical type and supported at about the mid-length of the frame upon curved bars $e\ e$. Upon the forward part of the frame, in front of the boiler, is a box or receptacle, C, for coal, which should be of sufficient capacity for carrying coal for a day's use. The truck will also carry a water-tank of suitable capacity.

At the rear part of the frame, and at the center, are mounted the two steam-cylinders $f\ f$, the pistons of which extend to the rear, and are connected to separate cross-heads $g$, fitted for movement in slides $h'$. The object of the separate cross-heads is to prevent the engine from being caught on a center. In front of the cylinder, and above the rear axle, is mounted a double-crank shaft, $h$, from the cranks of which rods $m$ extend to the cross-heads $g$, the connection being at the outer side of the slides $h'$.

On the shaft $h$ are gear-wheels $i$, meshing with larger gear-wheels $k$, that are on the rear axle, $a$. Upon the shaft $h$ there is also a pulley, $l$, for connection of a belt when the engine is used as a stationary power; or, if desired, there may be a separate shaft with gear-wheels for engaging the gear-wheels $i$ when they are unshipped from engaging with the wheel $k$.

In order to give rotation to the wheels $b$ by means of the shaft $a$, the shaft is formed at its end with flanges $n$, and the wheels are provided with pins $o\ o$, projecting from their hubs, on opposite sides of the center, so that the flanges $n$ shall come in contact with the pins, and thus carry the wheels with the shaft. At the same time this construction allows about a quarter-rotation of the wheels upon the shaft to facilitate turning the machine upon sharp curves.

The forward axle may be provided with a bolster and spring, as in ordinary wagons, so as to make the machine easy-riding. In order to guide the engine, there is provided upon the forward part of the frame a shaft carrying a hand-wheel, $p$, and a sprocket or chain wheel, $r$, from which a chain, $q$, passes to a similar sprocket-wheel on a cross-shaft or drum, $s$, mounted beneath the frame of the machine. From the drum $s$ ropes or chains pass to the forward axle, $c$. By this construction, by turning the hand-wheel $p$, the axle is moved to the right or left, as desired, for changing the direction of the engine. The steering-wheel $p$ is provided with a brake-wheel, $t$, and a brake-lever, $u$, is fitted on the frame of the machine, in position for being brought into contact with the brake-wheel $t$. This is for the purpose of holding the steering-wheel and preventing any lateral movement of the forward axle while passing over obstructions.

On the frame of the machine is fitted a suitable cab, D, for protecting the machinery and the engine-men from the weather. Beneath the rear part of the frame A is a draft-hook, $v$, for connection of the carriage to be drawn by the engine. In front of the draft-hook is a sheave, $w$, that is for receiving a chain which will be connected with the rear carriage, the object being to cause the carriages to follow the engine around a curve.

At the rear part of the frame is fitted a staff, $a'$, that is for supporting the frame in case of necessity. Usually this staff will be sustained in a horizontal position, as shown in Fig. 1.

It will be seen that the weight of the machinery and parts is carried low on the frame A, so that there is little or no danger of the machine upsetting.

In practice I shall work the valves with the ordinary link-motion common to locomotives.

Having thus described my invention, what I claim as new, and desire to secure by Letters Patent, is—

The combination of the brake-wheel $t$, the brake-lever $u$, and steering-wheel $p$, substantially as shown and described.

C. R. SWEET.

Witnesses:
　G. W. C. CLERE,
　ALEXANDER SIMPSON.